United States Patent [19]

Honjo

[11] 4,409,467
[45] Oct. 11, 1983

[54] PORTABLE PRINTING ELECTRONIC CALCULATOR USING MULTIPLE FOLDED RECORDING PAPER

[75] Inventor: Yoshiaki Honjo, Higashiyamato, Japan

[73] Assignee: Casio Computer Co., Ltd., Tokyo, Japan

[21] Appl. No.: 214,482

[22] Filed: Dec. 9, 1980

[30] Foreign Application Priority Data

Dec. 21, 1979 [JP] Japan .......................... 54-177569[U]
Dec. 21, 1979 [JP] Japan .......................... 54-177570[U]
Dec. 21, 1979 [JP] Japan .......................... 54-177572[U]
Mar. 13, 1980 [JP] Japan .......................... 55-32715[U]

[51] Int. Cl.³ .................... G06C 29/00; B41J 11/00
[52] U.S. Cl. ........................... 235/58 CF; 400/613.2
[58] Field of Search ............ 235/58 R, 58 M, 58 CF, 235/58 P, 433, 50 A, 50 B, 50 R; 400/613.2, 613.3, 88, 91–94, 613.4

[56] References Cited

U.S. PATENT DOCUMENTS 4,040,511  8/1977  Beaven, Jr. et al. ............. 400/613.2
4,175,849  11/1979  La Porte ......................... 400/613.2

FOREIGN PATENT DOCUMENTS 2610936  10/1977  Fed. Rep. of Germany .
3002130  10/1980  Fed. Rep. of Germany .
2046671  11/1980  United Kingdom ............. 400/613.2

Primary Examiner—Thomas H. Tarcza
Attorney, Agent, or Firm—Frishauf, Holtz, Goodman & Woodward

[57] ABSTRACT

A compact portable printing electronic calculator comprises a holding section for receiving a recording paper tape which is multiple-folded in a large number of sheet forms and a printer set ahead of the recording paper tape outlet port of the holding section. The printer impresses data on the respective sheet forms, each time they are drawn out of the holding section.

14 Claims, 10 Drawing Figures

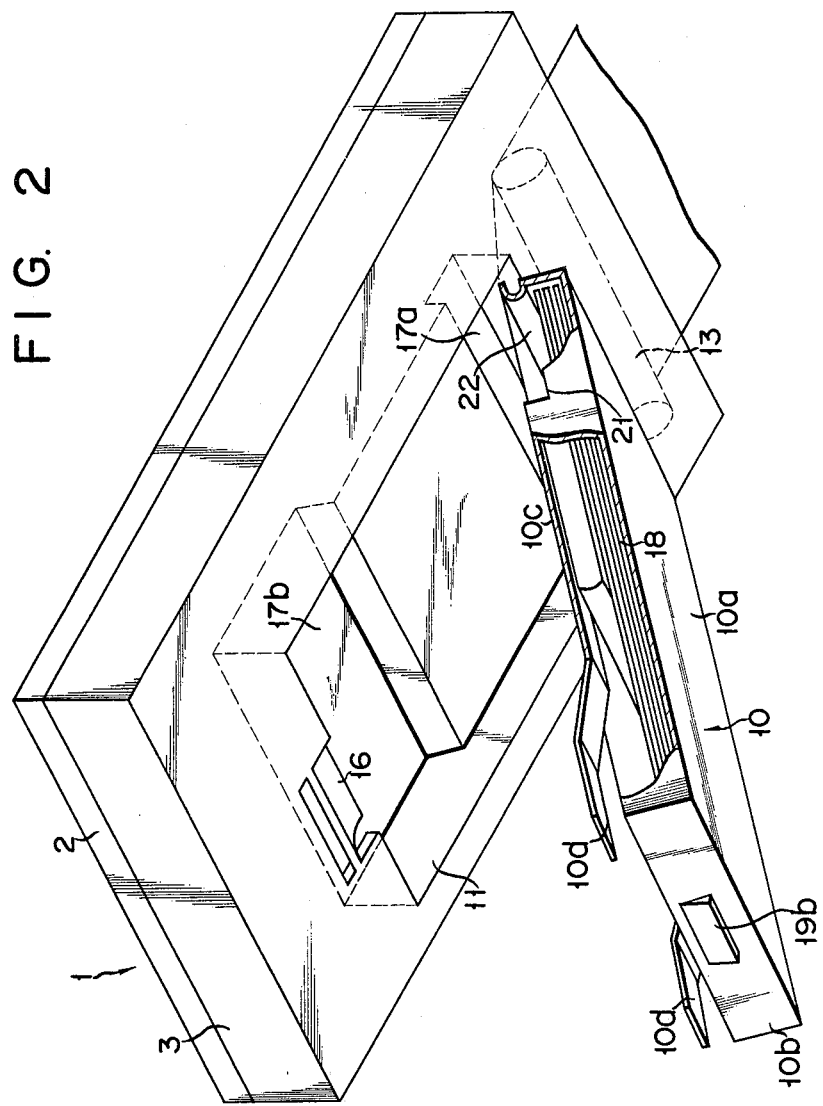

PORTABLE PRINTING ELECTRONIC CALCULATOR USING MULTIPLE FOLDED RECORDING PAPER

BACKGROUND OF THE INVENTION

This invention relates to a portable electronic calculator which is provided with a printer and in which a multiple-folded recording paper tape is received.

With a conventional portable electronic calculator having a printing function, a roll of a recording paper tape is used. In this case, the roll of the recording paper tape is supported outside of a calculator case. Therefore, the recording paper tape roll proves an obstacle in carrying the calculator, and presents inconvenience in using the calculator in the portable form. Therefore, a portable electronic calculator with a printer has already been marketed which is so designed as to receive a recording paper tape in a calculator case. However, the recording paper tape received in the calculator case is in the roll form, making it necessary to provide a space matching the diameter of said roll in the calculator case, which in turn has to be broadened in width. This arrangement unavoidably renders the calculator bulky, thus contradicting the object of providing a compact portable calculator. Nevertheless, a recording paper tape wound in a small roll is too much reduced in length for practical application. Further, the recording paper tape roll is rotatably supported by a shaft or bearing, making it necessary to provide a complicated supporting mechanism in a calculator case, and causing a recording paper tape roll to be set in place with a great deal of time and work. Where, however, a recording paper tape roll is simply placed in a calculator case in an unsupported state, then the roll tends to shake or fails to be smoothly rotated under a stable condition, presenting difficulties in being drawn out.

Therefore, a portable printing electronic calculator which is designed to receive a recording paper tape in a calculator case is demanded to be the type which enables a sufficiently long recording paper tape to be stably held in a thin space, is provided with a simple recording paper tape-holding mechanism, and allows for the easy loading of said recording paper tape.

It is accordingly the object of this invention to provide a portable, printing electronic calculator which holds a recording paper tape in a calculator case and yet can be rendered thin and compact.

SUMMARY OF THE INVENTION

According to one aspect of the present invention, a compact portable printing electronic calculator comprises a calculator body; a recording paper tape-holding cartridge for holding a multiple-folded recording paper tape therein, the multiple-folded recording paper tape having a forward end portion, the recording paper tape-holding cartridge including an outlet port having a guide member projecting above the forward end portion of the uppermost portion of the multiple-folded recording paper tape in the recording paper tape-holding cartridge; the guide member comprising means defining a press plane for supporting the forward end portion of the uppermost portion of the recording paper tape which is brought to the outlet port, and means defining a guide plane for guiding the forward end portion of the uppermost portion of the recording paper tape out of the recording paper tape-holding cartridge in an unfolded state; and a printer located in the calculator body and including means for printing data on the recording paper tape which is guided and delivered out from within the recording paper tape-holding cartridge.

A portable printer-carrying electronic calculator embodying this invention has the advantages that a long recording paper tape is held in a thin space provided in a calculator body. A recording paper tape-holding section formed in the calculator body is made thin, thereby rendering the calculator body thin and compact as a whole. The subject calculator can be carried without difficulties. A long recording paper tape is received in the recording paper tape-holding section under a stable condition in a state multiple-folded in a large number of sheet forms, and an exclusive member such as a shaft or bearing for rotatably supporting, for example, a recording paper tape roll can be dispensed with, thereby simplifying the arrangement of the recording paper tape-holding section and allowing for the easy loading of a long recording paper tape in the recording paper tape-holding section.

BRIEF DESCRIPTION OF THE DRAWINGS

FIG. 2 is an oblique view of the electronic calculator of FIG. 1;

DETAILED DESCRIPTION

Figure 1:
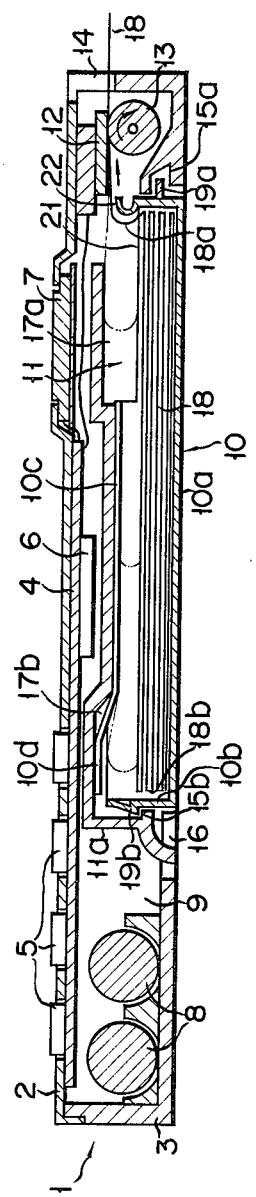
FIG. 1 is a longitudinal sectional view of a printing electronic calculator according to one embodiment of this invention.
Figure 3:
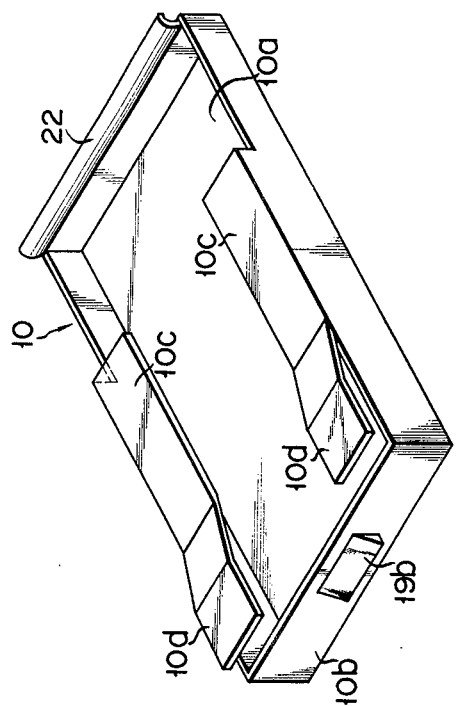
FIG. 3 is an oblique view of a cartridge used with the electronic calculator of the invention.

Referring to FIGS. 1 to 3, reference numeral 1 denotes a case of a printing electronic calculator according to one embodiment of this invention. This calculator 1 comprises an upper case section 2 and a lower case section 3 which are prepared from synthetic resin and assembled into a thin box-shaped case. The upper case section 2 is provided with a circuit substrate 4. This circuit substrate 4 is fitted with the contacts of a plurality of push button switches 5, and an electronic part 6. A display device 7 is set on the front side (the right side of FIG. 1) of the upper case section 2. A cell holder 9 for supporting a power source cell 8 is provided on the rear side (the left side of FIG. 1) of the lower case section 3. A cartridge holder 11 for detachably supporting the later described recording paper tape cartridge 10 (hereinafter referred to as "a cartridge") is disposed at the center of the calculator case 1. A printer 12 of, for example, the thermal type and a delivery roller 13 are set on the front side (the right side of FIG. 1) of the calculator case 1 in a state vertically facing each other. The delivery roller 13 is rotated by an electric motor (not shown) in a direction in which a recording paper tape is forwarded. A recording paper tape outlet port 14 is formed in the front end portion of the calculated case 1.

Figure 4:
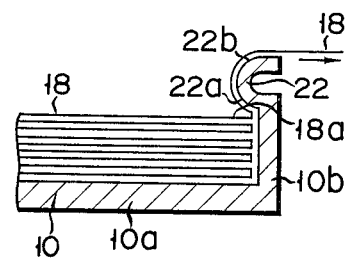
FIGS. 4 to 7 are fractional sectional views of a cartridge holding a multiple-folded recording paper tape.

Description is now given of the recording paper tape cartridge 10 and cartridge holder 11. The cartridge holder 11 is set in a concave form at the central port of the lower case section 3 with the lower side of the cartridge holder 11 left open. The cartridge holder 11 is provided with a cartridge-holding space having a rectangular plane and a prescribed depth. Engagement cavities 15a, 15b are formed at the center of both front and rear end portions of the lower opening of the cartridge holder 11. A cavity 16 is formed on the outside of the engagement cavity 15b in the rear part of the cartridge holder 11. A cavity 17a is provided in the front upper part of the cartridge holder 11. A cavity 17b is formed in the rear upper part of the cartridge holder 11. The recording paper tape cartridge 10 is prepared from a thin metal plate in the form of a thin rectangular box shape open at the top. The cartridge 10 holds a recording paper tape 18 multiple-folded in a large number of sheet forms, each having a prescribed length. As shown in FIG. 3, the cartridge 10 comprises a rectangular bottom wall 10a having a size corresponding to the width of the recording paper tape 18 and recording paper tape 18 multiple-folded in a large number of sheet forms each having a prescribed length; a peripheral wall 10b having a greater height or depth than the total height of the sheet forms of the multiple-folded recording paper tape 18; a pair of upper walls 10c, 10c extending along the upper edges of both lateral portions of the peripheral wall 10b in parallel with the sheet forms of the multiple-folded recording paper tape 18 held in the cartridge 10; and tension plates 10d, 10d mounted on said paired upper walls 10c, 10c in a state extending toward the rear side of the cartridge 10 at a space from the upper edges of both lateral portions of the peripheral wall 10b. Engagement projections 19a, 19b respectively detachably engageable with the engagement cavities 15a, 15b are formed at the central part of the front and rear portions of the peripheral wall 10b. When, therefore, the cartridge 10 is inserted into the cartridge holder 11 at its opening, and the engagement projections 19a, 19b are elastically fitted into the engagement cavities 15a, 15b of the cartridge holder 11, then the cartridge 10 is securely set in the cartridge holder 10. When the finger is put into the cavity 16 of the lower case section 3, and the peripheral wall 11a of the cartridge holder 11 is deformed by being pushed toward the rear side of said holder 11, then the engagement projection 19b is released from the engagement cavity 15b, ejecting the cartridge 10 from the cartridge holder 11 at its opening. The cartridge 10 can be easily loaded in the holder 11 and withdrawn therefrom. The upper edges of both lateral front end portions of the peripheral wall 10b of the cartridge 10 are notched to provide a recording paper tape outlet port 21. A recording paper tape guide member 22 is integrally formed on the upper edge of the front end portion of the peripheral wall 10b in a state extending along the substantialy full crosswise length of the cartridge 10. The guide member 22 has a function of pressing the forward end portion 18a of the respective sheet forms of the multiple-folded recording paper tape 18, preventing two or more sheet forms from being drawn out at the same time, opening said forward end portion 18a while it is being drawn out, and guiding it to the outside. As shown in FIG. 4, the guide member 22 having an arcuate cross section projects inward above the forward end portion 18a of the uppermost sheet form of the multiple-folded recording paper 18. The arcuate guide member 22 comprises a press plane 22a facing the forward end portion 18a of the uppermost sheet of the multiple-folded recording paper tape 18 at a point above said forward end 18a and a guide plane 22b extending upward in the arcuate form. The recording paper tape 18 is first folded in a large number of sheet forms each having a prescribed length, and then a cartridge 10 placed in the holder 11 of the calculator case 1 is pulled out. The paired tension plates 10d, 10d of the cartridge 10 are pushed up to provide a sufficient space between the rear portion of the peripheral wall 10b and said tension plates 10d, 10d. The multiple-folded recording paper tape 18 is inserted into the cartridge 10 through the above-mentioned space. Thereafter, the tension plates 10d, 10d are brought back to the original position. Therefore, the multiple-folded recording paper tape 18 is received in the cartridge 10 in a state supported by the bottom wall 10a, peripheral wall 10b and paired upper walls 10c, 10c of the cartridge 10. The forward end 18a of the uppermost sheet form of the multiple-folded a recording paper tape 18 and those (18a) of the respective succeeding sheet forms are pressed down by the guide member 22. Thus, the multiple-folded recording paper tape 18 is easily and neatly placed in the cartridge 10 under a stable condition. The cartridge 10 loaded with the multiple-folded recording paper tape 18 is securely set in the cartridge holder 11 of the calculator case 1. In this case, the forward end portion 18a of the uppermost sheet form of the multiple-folded recording paper tape 18 is already drawn into a space defined between the printer 12 and delivery roller 13 (FIG. 1). When the cartridge 10 is set in the cartridge holder 11, the tension plates 10d, 10d are passed against the upper walls of the corresponding rear end cavities 17b, 17b of the cartridge holder 11. The sheet forms of the multiple-folded recording paper tape 18 received in the cartridge 10 are chosen to have such a total height as leaves a space between the uppermost sheet form and the paired upper walls 10c, 10c of the cartridge 10. When the multiple-folded recording paper tape 18 is used up, then the cartridge 10 is pulled out of the cartridge holder 11, and a fresh multiple-folded recording paper tape 18 is placed in the cartridge. The cartridge 10 loaded with the multiple-folded recording paper tape 18 is set again in the holder 11. Placement of the multiple-folded recording paper tape 18 in the cartridge 10 taken out of the holder 11 can be effected with great ease.

When the push button switches 5 mounted on the calculator case 1 are selectively actuated to supply data to a circuit section formed of the circuit substrate 4 and electronic part 6, then an output signal from the circuit section causes the printer 12 to impress data on that sheet form of the multiple-folded recording paper tape 18 which now faces the printer 12. Later, the delivery roller 13 is rotated to advance the multiple-folded recording paper tape 18. As a result, the impressed uppermost sheet form of said multiple-folded recording paper tape 18 is drawn out of the calculator case 1 at the outlet port 14. The delivery roller 13 is rotated, while the impressed uppermost sheet form of the multiple-folded recording paper tape 18 is held between the printer 12 and said roller 13. As a result, the impressed uppermost sheet form of the multiple-folded recording paper tape 18 is horizontally pulled out of the cartridge 10 at the outlet port 21 by the forwarding force of the delivery roller 13. The immediately succeeding sheet form of the multiple-folded recording paper tape 18 is brought ahead of the priner 12 ready for impression. Each time impression is made, the respective sheet forms of the multiple-folded recording paper tape 18 are forwarded to a prescribed extent.

Description is now given with reference to FIG. 1 of the process by which the impressed uppermost sheet form of the multiple-folded recording paper tape 18 is pulled out of the cartridge 10. When the impressed uppermost sheet form of the multiple-folded recording paper tape 18 undergoes a forwarding force acting in the direction of an arrow indicated in FIG. 1, then said impressed uppermost sheet form is pushed forward. As a result, the rear end portion 18b of said impressed uppermost sheet form is lifted up in the arcuate form as indicated in a broken line toward the tension plates 10d, 10d. At this time, the upper surface of said lifted rear end portion 18b tightly contacts the upper walls 10c, 10c of the cartridge 10 due to the elasticity of the recording paper. The above-mentioned tight contact allows for the easy withdrawal in a flat horizontal state of the impressed uppermost sheet form of the multiple-folded recording paper tape 18 from the cartridge 10 at the outlet port 21. At this time, the aforesaid arcuately lifted rear end portion 18b of the impressed uppermost sheet form of the multiple-folded recording paper tape 18 moves forward into the forward end cavity 17a of the cartridge holder 11. This event also helps the forward end 18a of the impressed uppermost sheet form to be easily pulled out of the cartridge 10. Last, said impressed uppermost sheet form is released from the pressure of the guide member 22 of the cartridge 10 and carried to the outside in an open state.

Description is now given of the function of the guide member 22. The guide member having an arcuate cross section projects above the forward end 18a of the uppermost sheet form of the multiple-folded recording paper tape 18, with the press plane 22a of the guide member 22 made to face the forward end 18a. Accordingly, the press plane 22a of the guide member 22 presses downward the forward end 18a of the uppermost sheet form of the multiple-folded recording paper tape 18 and also those (18a) of the succeeding sheet forms of the multiple-folded recording paper tape 18. In the initial stage where the uppermost sheet form of the multiple-folded recording paper tape 18 is drawn out, the rear end portion 18b of said uppermost sheet is lifted in the arcuate form. At this time, the forward end 18a also tends to rise at the same time. However, said forward end 18a is pressed against the press plane 22a of the guide member 22, and prevented from rising. Further, while the forward end 18a of the uppermost sheet form of the multiple-folded recording paper tape 18 is being drawn out along the guide member 22, the forward end 18a of the immediately succeeding sheet form of said multiple-folded recording paper tape 18 tends to be lifted at the same time. Yet, the forward end 18a of said immediately succeeding sheet form is pressed against the press plane 22a of the guide member 22, and is also prevented from being lifted. When each preceding sheet form of the multiple-folded recording paper tape 18 is fully pulled out, then the forward end 18a of each succeeding sheet form of said multiple-folded recording paper tape 18 abuts against the press plane 22a of the guide member 22 having an arcuate cross section. Therefore, two or more sheet forms of said multiple-folded recording paper tape 18 are prevented from being drawn out at the same time in a superposed state. Consequently, the respective sheet forms of the multiple-folded recording paper tape 18 can be pulled out in a regular order under a stable condition. The upper portion of the guide member 22 behind its press plane 22a is constituted by a contiguous guide plane 22b. When the forward end 18a of each sheet form of the multiple-folded recording paper tape 18 is moved upward after leaving the press plane 22a of the guide member 22, then said sheet form is guided outward along the guide plane 22 in a state warped in a direction opposite to that in which said sheet form was initially folded. Therefore, said sheet form can be smoothly drawn out.

Figure 5:
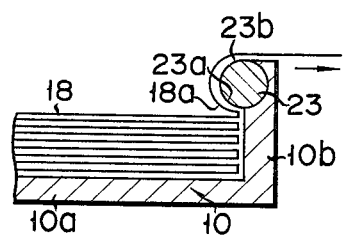
Figure 6:
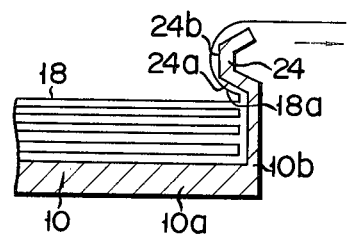
Figure 7:
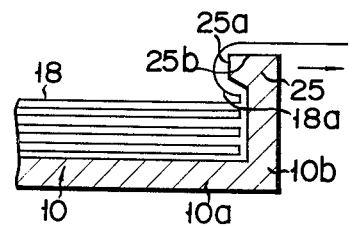

The cross sectional shape of a guide member need not be limited to that of the guide member 22 used in the aforementioned embodiment. It is possible to attach a guide member 23 having a circular cross section as shown in FIG. 5 to the peripheral wall 10b of the cartridge 10 by proper means, for example, by applying an adhesive. Referring to FIG. 5, reference numeral 23a denotes a press plate, and reference numeral 23b indicates a guide plane. Further, it is possible to provide guide members 24, 25 each having an angular cross section as shown in FIGS. 6 and 7 respectively. Referring to FIG. 6, reference numeral 24a shows a press plane and reference numeral 24b represents a guide plane. Referring to FIG. 7 reference numeral 25a is a press plane, and reference numeral 25b is a guide plane. In short, any guide member well serves the purpose, provided it has a press plane and guide plane. Further, a guide member may be formed integrally with the cartridge 10 or separately therefrom.

Figure 8:
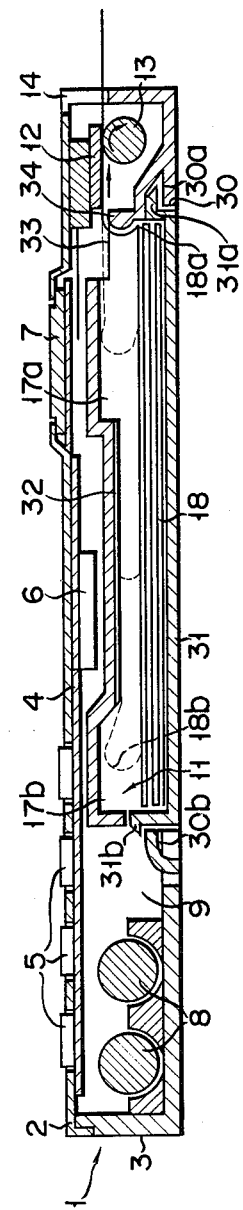
FIG. 8 is a longitudinal sectional view of a printer-carrying electronic calculator according to another embodiment of the invention.
Figure 9:
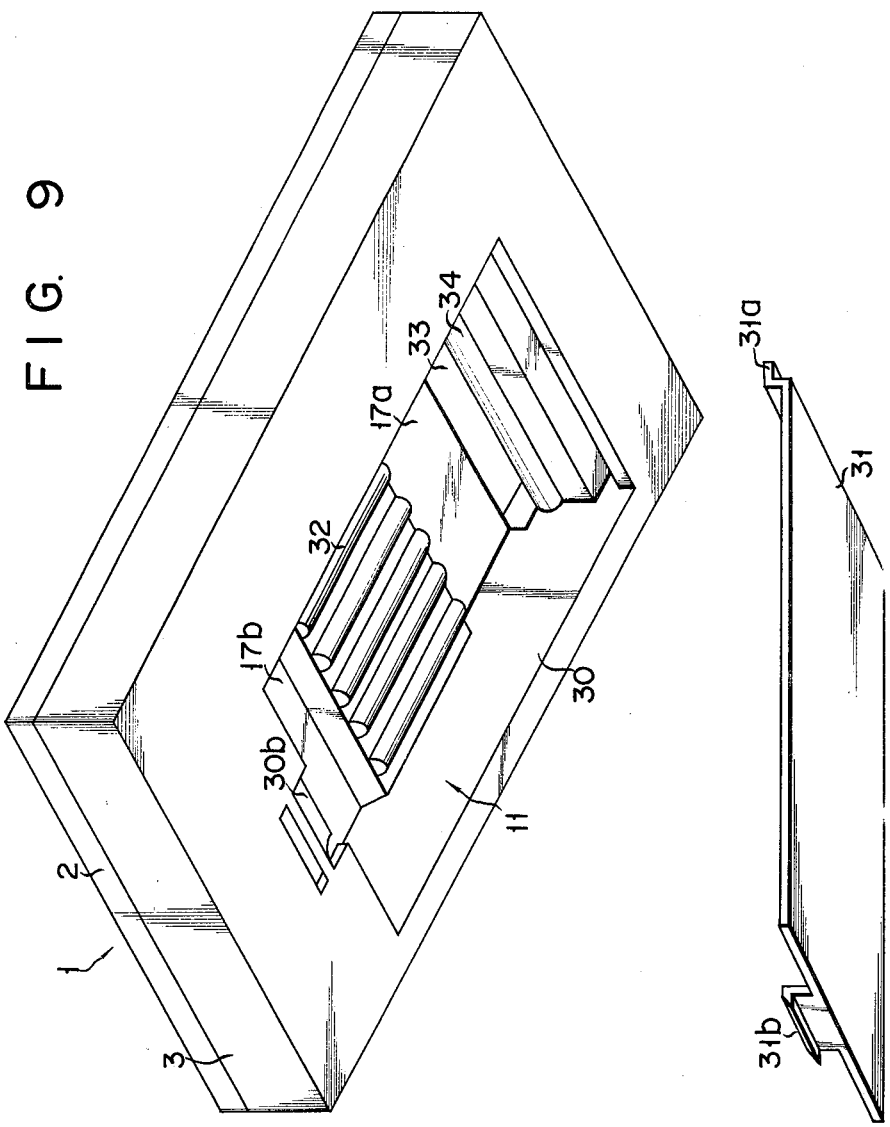
FIG. 9 is an oblique view of the printer-carrying electronic calculator of FIG. 8.

A member for holding a multiple-folded recording paper tape 18 need not be limited to a cartridge detachably attached to an electronic calculator case. It is possible to permanently build a receptacle of a multiple-folded recording paper tape in a calculator case. In this case, a guide member may be formed integrally with said receptacle or separately therefrom. This embodiment is described with reference to FIGS. 8 and 9. The parts of FIGS. 8 and 9 the same as those of FIGS. 1 and 2 are denoted by the same numerals, description thereof being omitted. Referring to FIG. 9, a recording paper tape receptacle 11 is constructed by forming a recording paper tape-holding cavity at the center of the bottom wall of a lower case section 3 of a calculator case 1. A recording paper tape 18 multiple-folded in a large number of sheet forms is held in said cavity. The space of the recording paper tape receptacle 11 has a flat rectangular shape and a sufficient depth to hold the whole of the multiple-folded recording paper tape 18. A recording paper tape-loading port 30 is formed in the lower case section 3 of the recording paper tape receptacle 11. Detachably fitted to the loading port 30 is a rectangular cover, 31 made of synthetic resin. An engagement projection 31a is formed at the front end of the cover 31 to be engaged with an engagement cavity 30a provided at the front end of the loading port 30. An engagement projection 31b is provided at the rear end of the cover 31 to be engaged with an engagement cavity 30b formed at the rear end of the loading port 30. A plurality of ridges 32 extending lengthwise of the recording paper tape receptacle 11 are arranged in the central part of the underside of the bottom wall of the lower case section 3 to press the uppermost sheet form of the multiple-folded recording paper tape 18. The front and rear portions of the underside of the bottom wall of the lower case section 3 are respectively provided with cavities 17a, 17b to release the uppermost sheet form of the multiple-folded recording paper tape 18. An outlet port 33 is formed in the front upper part of the recording paper tape receptacle 11 to allow for the withdrawal of the uppermost sheet form of the multiple-folded recording paper tape 18. The printer 12 and delivery roller 13 are set ahead of the outlet port 33. A guide member 34 is provided below the outlet port 33 in a state extending along the width of the recording paper tape 18. The front part of the guide member 34 projects above the forward end 18a of the uppermost sheet form of the multiple-folded recording paper tape 18. The guide member 34 has an arcuate cross section to hold the forward end 18a of the uppermost sheet form and guide it outward in an open state.

The cover 31 is taken off to open the loading port 30. The recording paper tape 18 multiple-folded in a large number of sheet forms is easily inserted into the receptacle 11 at said loading port 30. After said loading, the cover 31 is fitted to the receptacle 11 to close the loading port 30. After being pulled out of the outlet port 33, the uppermost sheet form of the multiple-folded recording paper tape 18 passes between the printer 12 and delivery roller 13. The multiple-folded recording paper tape 18 is neatly and stably supported in a flat horizontal position in the receptacle 11 between the peripheral wall and underside of the bottom wall of the lower case section 3 surrounding the receptacle 11 on one hand, and the cover 31 on the other. The numerous sheet forms of the multiple-folded recording paper tape 18 are chosen to have a smaller height than the depth of the receptacle 11, thereby providing a space between the uppermost sheet form of the multiple-folded recording paper tape 18 and the ridges 32 formed in the central part of the underside of the bottom wall of the lower case section 3.

Description is now given of the process by which the impressed uppermost sheet form of the multiple-folded recording paper tape 18 is drawn out. When undergoing a force acting in the direction of an arrow indicated in FIG. 8, the uppermost sheet form is carried in said direction, causing the rear end portion 18b of the uppermost sheet to be lifted in the arcuate form as indicated in a broken line in FIG. 8 into a cavity 17b formed in the rear upper portion of the recording paper tape receptacle 11. At this point, the whole of the uppermost sheet form is raised due to the elasticity of the recording paper to contact the aforesame ridges 32 formed in the central part of the underside of the bottom wall of the lower case section 3. At this time, the rear end portion 18b lifted into the cavity 17b is smoothly opened, enabling the whole of the uppermost sheet form to be easily drawn out. The whole uppermost sheet form is forwarded in contact with the ridges 32. The uppermost sheet form is horizontally pulled out of the outlet port 33 in a flat state. The ridges 32 prevent the uppermost sheet from being statically adsorbed to the underside of the bottom wall of the lower case section 3. Where the uppermost sheet form is carried forward to a certain extent, the rear end portion 18b is brought into the front upper cavity 17a of the recording paper tape receptacle 11, enabling the forward end portion 18a of the uppermost sheet form to be smoothly pulled out by being guided under pressure over the arcuate plane of the guide member 34. Thus, the guide member 34 prevents two or more sheet forms of the multiple-folded recording paper tape 18 to be pulled out at the same time in a superposed state. The above-mentioned arrangement enables the uppermost and succeeding sheet forms of the multiple-folded recording paper tape 18 to be drawn out smoothly under a stable condition.

Figure 10:
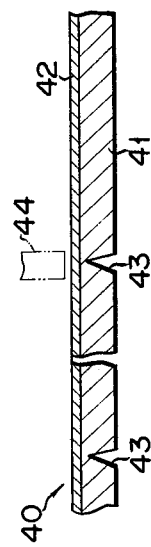
FIG. 10 is a longitudinal sectional view of a recording paper tape.

FIG. 10 shows the construction of a sheet of heat-sensitive recording paper for thermal printing. Reference numeral 40 is heat-sensitive recording paper. 41 is a base sheet. 42 is a heat-sensitive color-producing layer mounted on the base sheet 41, 43 which denotes notches for enabling a recording paper tape to be easily multiple-folded in a large number of sheet forms. The notch 43 is formed on the backside of the base sheet 41, namely, on that side of the recording paper tape 18 which is opposite to that on which an impression is made, with a slightly smaller depth than the thickness of the base sheet 41.

The notch 43 is cut in the base sheet 41 without penetrating it. The reason for this is that a notch 43 cut throughout the base sheet 41 would give rise to slight irregularies in the heat-sensitive color-producing layer 42; whereas a notch formed with the above-mentioned depth renders the surface of the heat-sensitive color-producing layer 42 flat and smooth, and moreover imparts a certain degree of tensile strength to the recording paper tape 18.

A recording paper tape 18 used with a portable printing electronic calculator embodying this invention is received in a calculator case in a state capable of being easily multiple-folded at the notches 43 into a large number of sheet forms. Since the notches 43 do not appear on the impression-bearing surface of the respective sheet forms of the multiple-folded recording paper tape 18, numerals and characters can be impressed on the surface of each sheet form in a distinct complete form. With the foregoing embodiment, reference was made to a heat-sensitive recording paper tape. However, this invention is not limited to this type of recording paper tape. It is possible to cut out notches in the above-mentioned manner in the opposite surface of a paper tape allowing for static recording or recording effected by discharge to an impression-bearing surface and multiple-folding paper tape at the notches in a large number of sheet forms. Further, the ordinary type of recording paper tape can be multiple-folded at said notches.

What is claimed is:

1. A compact portable printing electronic calculator comprising:
    a calculator body having a cartridge receiving opening at the lower portion thereof;
    a cartridge holding section in said calculator body and in communication with said cartridge receiving opening, said cartridge holding section including an engaging portion formed inside an end of said cartridge receiving opening;
    a cartridge which is insertable and removable from said cartridge holding section of said calculator body, said cartridge holding a multiple-folded recording paper tape therein, and having a latching portion adapted to be brought into latching engagement with said engaging portion of said cartridge holding section, and a lower surface portion for closing said opening and cartridge holding section when said cartridge is placed and held in said cartridge holding section with said latching portion in latching engagement with said engaging portion of said cartridge holding section, said lower surface portion of said cartridge serving as a cover for said cartridge holding section; and
    a printer disposed in said calculator body and including means for printing data on the recording paper tape which is delivered thereto from within said cartridge mounted in said calculator body.

2. The printing electronic calculator of claim 1, further including a display section and key input section on an upper surface of said calculator body; and an electrical cell juxtaposed adjacent said cartridge in said holding section in the calculator body.

3. The printing electronic calculator of claim 1, wherein said cartridge includes a recording paper tape outlet port having a guide member which projects above the forward end portion of the uppermost portion of the multiple-folded recording paper tape received in said cartridge, and comprises a press plane for supporting the forward end portion of said uppermost portion of the recording paper tape brought to said outlet port and a guide plane for enabling the forward end portion of said uppermost portion of the recording paper tape to be drawn out from said cartridge in an unfolded state.

4. A compact portable printing electronic calculator comprising:
   a calculator body;
   a recording paper tape-holding means for holding a multiple-folded recording paper tape therein and in said calculator body, said multiple-folded recording paper tape having a forward end portion, said recording paper tape-holding means including an outlet port having a guide member projecting above the forward end portion of the uppermost portion of the multiple-folded recording paper tape in the recording paper tape-holding means; said guide member comprising means defining a press plane for supporting the forward end portion of the uppermost portion of the recording paper tape which is brought to the outlet port, and means defining a guide plane for guiding the forward end portion of the uppermost portion of the recording paper tape out of said recording paper tape-holding means in an unfolded state; and
   a printer located in the calculator body and including means for printing data on the recording paper tape which is guided and delivered out from within the recording paper tape-holding means.

5. The compact portable printing electronic calculator of claim 4, wherein said press plane of said guide member includes means for pressing against the forward end porton of said multiple-folded recording paper tape while said uppermost portion is brought to said outlet port, thereby preventing said forward end portion from rising in said tape-holding means and preventing more than one sheet form of said multiple-folded recording paper tape from being drawn out at the same time.

6. The compact portable printing electronic calculator of claim 4 or 5, wherein said guide plane of said guide member comprises means for guiding said forward end portion of said uppermost portion out of said tape-holding means after said uppermost portion of said recording paper tape leaves said press plane.

7. The compact portable printing electronic calculator of claim 6, wherein said press plane and guide plane of said guide member are contiguous, said guide plane being located above said press plane.

8. The compact portable printing electronic calculator of claim 4, wherein said press plane and said guide plane of said guide member are contiguous, and said guide plane is located above said press plane.

9. The compact portable printing electronic calculator of claim 4 or 5, wherein said calculator body has a cartridge receiving receptacle portion therein, and wherein said recording paper tape-holding means comprises a cartridge which is removably insertable in said cartridge receiving receptacle portion of said calculator body.

10. The compact portable printing electronic calculator of claim 4 or 5, wherein said recording paper tape-holding means is integrally formed with said calculator body.

11. A compact portable printing electronic calculator comprising: a calculator body having a recording paper tape-holding means for holding a multiple-folded recording paper tape in said calculator body, said recording paper tape being deliverable from said recording paper tape-holding means, said recording paper tape-holding means including a plurality of ridges on an inner wall surface thereof which contacts said multiple-folded recording paper tape, said ridges extending in the tape delivery direction to prevent the uppermost portion of the recording paper tape from being statically attracted thereto; and a printer located in the calculator body and for receiving the delivered recording paper tape, said printer including means for printing data on the recording paper tape delivered from said recording paper tape-holding means.

12. The compact portable printing electronic calculator of claim 11, wherein said inner wall surface having said ridges thereon is an upper inner wall of said recording paper tape-holding means which is above the plane of said multiple-folded recording paper tape.

13. The compact portable printing electronic calculator of claim 12, wherein said inner wall surface having said ridges thereon is integrally formed with said calculator body.

14. The compact portable printing electronic calculator of claim 11, wherein said recording paper tape-holding means is integrally formed with said calculator body, and wherein said inner wall surface having said ridges thereon is an inner wall of said calculator body which is located above the plane of said multiple-folded receiving paper tape.

* * * * *